United States Patent Office 3,169,966
Patented Feb. 16, 1965

3,169,966

AMINOPYRAZOLES

Paul Schmidt, Therwil, and Kurt Eichenberger and Max Wilhelm, Basel, Switzerland, assignors to Ciba Corporation, New York, N.Y., a corporation of Delaware No Drawing. Filed Jan. 18, 1962, Ser. No. 167,167
Claims priority, application Switzerland, Jan. 24, 1961, 770/61; Apr. 12, 1961, 4,305/61; July 13, 1961, 8,240/61; Sept. 13, 1961, 10,598/61; Nov. 15, 1961, 13,274/61
26 Claims. (Cl. 260—286)

The present invention relates to 3-aminopyrazoles. More particularly it concerns 3-amino-pyrazoles substituted in position 5 by a pyridyl-(4) radical, their N-acyl derivatives, the quaternary ammonium derivatives of these compounds, and salts thereof.

The new compounds may be further substituted in the nuclei, for example in position 4. Suitable substituents are, for example: Lower alkyl radicals, phenyl radicals which may be substituted by lower alkyl or alkoxy groups or by halogen atoms, or halogen atoms. In the above context and in the following lower alkyl or alkoxy radicals are more especially methyl, ethyl, propyl, or isopropyl groups, or straight or branched butyl, pentyl, hexyl or heptyl groups linked in any desired position, or the corresponding alkoxy radicals, or halogen atoms, above all fluorine, chlorine, bromine or the pseudohalogen trifluoromethyl. The pyridyl radical may be substituted, for example, by lower alkyl or alkoxy groups and/or by fused-on benzene nuclei, for example a 2-methyl-quinolyl radical.

More especially, the new compounds may be substituted at the cyclic nitrogen atom 2 of the pyrazole ring, preferably by unsubstituted or substituted hydrocarbon radicals, or by saturated or unsaturated heterocyclic or heterocyclyl-aliphatic radicals.

Hydrocarbon radicals in position 2 are, for example, saturated or unsaturated aliphatic, alicyclic, alicyclic-aliphatic, araliphatic or aromatic hydrocarbon radicals, such as lower straight or branched alkyl groups, for example methyl, ethyl, propyl, isopropyl, or straight or branched butyl, pentyl, hexyl or heptyl groups linked in any desired position; cycloalkyl groups such as cyclopentyl, cyclohexyl or cycloheptyl radicals, cycloalkyl-alkyl groups, such as cyclophentyl-methyl, -ethyl or -propyl groups; aralkyl such as phenyl-methyl, -ethyl, or -propyl groups; or aryl, more especially phenyl, radicals. Particularly suitable heterocyclic or heterocyclyl-aliphatic radicals are mononuclear ones such as pyridyl or piperidyl, for example N-alkyl-piperidyl-(4), radicals.

As substituents in the aforementioned aliphatic radicals in position 2 there may be mentioned above all free or substituted hydroxyl, mercapto or amino groups in which the substituents are preferably aliphatic and may be linked with the aliphatic radical. There are suitable, for example, lower alkoxy-, alkylmercapto- or mono- or dialkyl- or -cycloalkylamino groups, alkyleneamino, oxaalkyleneamino, azaalkyleneamino or thiaalkyleneamino groups such as methyl-, ethyl-, propyl-, butyl-, pentyl- or hexyloxy or -mercapto groups; methylamino, dimethylamino, ethylamino, diethylamino, propylamino, dipropylamino, N-methyl-N-propylamino, N-methyl-N-cyclopentylamino, butylamino, or di-butylamino groups; pyrrolidino, piperidino, morpholino or piperazino groups, for example, the piperazino, N-methylpiperazino, or N-hydroxyethylpiperazino group.

The alicyclic radicals may contain in position 2 primarily lower alkyl radicals.

Aromatic or heterocyclic radicals in position 2 may contain above all halogen atoms or the above-mentioned alkyl or alkoxy groups, while in the alicyclic-aliphatic, araliphatic or heterocyclyl-aliphatic radicals both constituents may be substituted as defined above.

N-acyl compounds, such as mono- or di-N-acyl compounds, are above all those derived from carbonic acid or its derivatives or from lower aliphatic, alicyclic, aromatic or heterocyclic acids, for example carbonic acid or its derivatives, such as carbamic acids, for example N-alkyl-carbamic acid, lower fatty acids, such as acetic, propionic, butyric or pivalic acid or their halogeno-, hydroxy- or amino-substitution products; cycloalkane-carboxylic acids, such as cyclopentyl- or cyclohexyl-carboxylic acid; cycloalkyl-alkanecarboxylic acids, for example cyclophentylpropionic acid; unsubstituted benzoic acids or benzoic acids substituted by lower alkyl or alkoxy groups or by halogen atoms; or pyridinecarboxylic acids, for example nicotinic or isonicotinic acid.

Quaternary ammonium derivatives of the new compounds are above all lower alkylammonium compounds, or benzylammonium compounds which may be substituted in the nucleus.

The new compounds possess anti-inflammatory, antipyretic, analgesic and antiallergic and, as far as 2-piperidyl-(4)-compounds, particularly the 2-(N-methylpiperidyl-4)-3-amino-5-pyridyl-(4)pyrazole, are concerned, also hypotensive properties and may find pharmacological use in the animal. Above all they may be used as medicaments, for example for the treatment of inflammatory or allergic processes or for alleviating pain in humans and animals. Furthermore, they are also valuable intermediates for the manufacture of other, more especially pharmacologically useful, compounds.

Particularly valuable are compounds of the formula

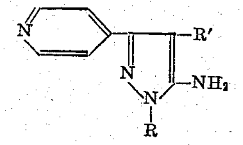

and their N-acyl derivatives and salts hereof, where R represents hydrogen or a lower alkyl, hydroxyalkyl, aminoalkyl, mono- or di-lower alkylamino-alkyl, alkyleneimino-alkyl, azaalkyleneimino-alkyl, oxaalkyleneamino-alkyl or cycloalkyl group, for example one of those referred to above, or a phenyl radical which may be substituted by lower alkyl or alkoxy groups or by halogen atoms; or R may represent a pyridyl radical, for example, the pyridyl-(2) radical or an N-alkyl-piperidyl radical such as the N-methyl-piperidyl-(4) radical; R' represents hydrogen or a lower alkyl group.

Special mention in this connection deserve compounds of the formula

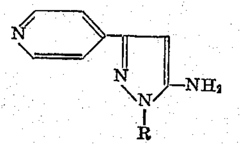

where R represents a lower alkyl such as a methyl, ethyl, propyl, butyl or pentyl group, above all a propyl, butyl, pentyl or hexyl radical which is branched or not linked in position 1, or a cycloalkyl, such as a cyclopentyl or cyclohexyl radical, a phenyl, halogenophenyl, lower alkoxyphenyl or lower alkylphenyl radical, or a pyridyl such as the pyridyl-(2) radical, or an N-alkyl-piperidyl such as the N-methyl-piperidyl-(4) radical, and their N-acyl, such as N-acetyl or alkylcarbamoyl, derivatives, and the salts of these compounds.

Of this group of compounds those of the formula

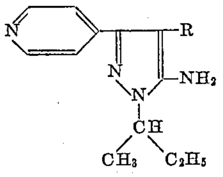

in which R represents hydrogen or a lower alkyl radical, and their N-lower alkanoyl or N-lower alkyl-carbamoyl derivatives, espceially the N-acetyl and N-ethylcarbamoyl derivatives, and their salts, are particularly outstanding.

In the first place there may be mentioned 2-secondary butyl-3-amino-5-pyridyl-(4)-pyrazole, 2-secondary butyl-3-acetylamino-5-pyridyl-(4)-pyrazole, N-diacetyl-2-secondary butyl-3-amino-5-pyridyl-(4)-pyrazole and N-[2-secondary butyl-5-pyridyl-(4)-pyrazolyl-(3)]-N'-ethylurea and their salts.

The new compounds are prepared by known methods, advantageously by reacting a hydrazine containing at least 3 hydrogen atoms upon a pyridyl-(4)-ketone that contains in α-position relatively to the carbonyl group at least one hydrogen atom and a nitrile group, such as a 4-(α-cyanoalkanoyl)-pyridine.

The reaction is carried out in known manner, advantageously in the presence of a diluent and, if desired, at an elevated temperature and/or in the presence of a condensing agent, for example a strong acid such as hydro-chloric acid, an aryl-sulfonic acid or a similar acid.

The resulting amino-pyrazoles can be N-acylated in a conventional manner, for example with a reactive derivative, such as a halide or anhydride, of the aforementioned acids, for example also isocyanates, advantageously in the presence of a conventional condensing agent.

A resulting 4-unsubstituted compound is easy to halogenate in position 4, for example by treatment with a chlorinating or brominating agent, above all with elemental chlorine or bromine or with a compound capable of giving off chlorine or bromine. A resulting tertiary amine can be quaternated in known manner, for example by reaction with a reactive ester of a lower alkanol or benzyl alcohol, such as a halide, sulfonate or sulfate thereof.

The aforementioned reactions are carried out in conventional manner in the presence or absence of diluents, condensing agents and/or catalysts, at room temperature or below or above it, if desired under superatmospheric pressure.

The unsubstituted or monosubstituted pyridoyl-(4)-acetonitriles used as starting materials, as well as the corresponding iminoethers and amidines and their salts are new. They are likewise included in the present invention. These compounds are obtained when a pyridyl-(4)-carboxylic acid ester such as an alkyl ester, for example the ethyl ester, is reacted with an unsubstituted or monosubstituted acetonitrile, whereupon from the condensation product a pyridoyl-(4)-acetonitrile is formed in known manner.

The other starting materials are known or can be prepared by known methods.

Depending on the reaction conditions and starting materials used the new compounds are obtained in the free form or in the form of their salts. Resulting free bases can form salts in the usual manner with inorganic or organic acids. On the other hand, the salts of the new compounds can be converted in known manner into the free compounds, acid addition salts, for example, by reaction with a basic agent. Thus, the salts are useful for purifying the free bases. Acid addition salts are preferably formed with therapeutically useful acids, for example hydrohalic acids, such as hydrochloric or hydrobromic acid, perchloric, nitric or thiocyanic acid, sulfuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, embonic, methanesulfonic, ethanesulfonic, hydroxyethanesulfonic, benzenesulfonic, paratoluenesulfonic, naphthalenesulfonic acid or sulphanilic acid, or methionine, tryptophan, lysine or arginine. The salts may be mono-salts or poly-salts.

Quaternary ammonium salts can also be converted—for example by reaction with freshly precipitated silver oxide on an ammonium halide, or by reaction of baryta solution on an ammonium sulfate, or with the use of basic ion-exchangers—into ammonium hydroxides from which, by reaction with acids, for example those mentioned above, other ammonium salts can be prepared. If desired, this exchange may be carried out directly with the use of a suitable ion-exchanger.

When the new compounds contain asymmetrical carbon atoms, they may take the form of racemates or mixtures of racemates which can be separated or resolved into the antipodes in conventional manner.

The new compounds are intended to be used as medicaments in the form of pharmaceutical preparations containing said compounds together with an organic or inorganic, solid or liquid pharmaceutical excipient suitable for enteral, for example oral, or parenteral administration. Suitable excipients are substances that do not react with the new compounds such, for example, as water, gelatine, lactose, starches, magnesium stearate, talc, vegetable oils, benzyl alcohols, gums, polyalkylene glycols, white petroleum jelly, cholesterol or other known pharmaceutical excipients. The pharmaceutical preparations may be, for example, tablets, dragees or capsules, or in liquid form solutions, suspensions or emulsions. They may be sterilized and/or may contain assistants such as preserving, stabilizing, wetting or emulsifying agents, salts for regulating the osmotic pressure or buffers. They may further contain other therapeutically useful substances. The new compounds may also be used in veterinary medicine, for example in one of the forms mentioned above.

The following examples illustrate the invention.

*Example 1*

A solution of 5 grams of methylhydrazine and 5 grams of isonicotinoyl acetonitrile in 10 cc. of ethanol is boiled for 6 hours. On cooling, crystalline 2-methyl-3-amino-5-pyridyl-(4)-pyrazole of the formula

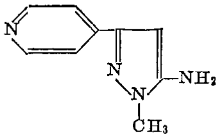

is obtained which melts at 213 to 215° C. after recrystallization from alcohol.

*Example 2*

A mixture of 10 grams of isopropylhydrazine, 10 grams of isonicotinoyl acetonitrile and 100 cc. of ethanol is refluxed 4 hours. The reaction mixture is then evaporated to dryness in a water-jet vacuum, and the radical is recrystallized from water, to yield 2-isopropyl-3-amino-5-pyridyl-(4)-pyrazole of the formula

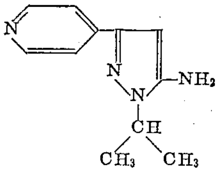

in white prisms melting at 150 to 152° C.

*Example 3*

10 grams of isonicotinoyl-acetonitrile are added to a solution of 9 grams of 2-hydrazinopyridine in 75 cc. of ethanol. The mixture is refluxed for 6 hours and then evaporated to dryness. The residue is recrystallized from water, to yield the 2-pyridyl-(2)-3-amino-5-pyridyl-(4)-pyrazole of the formula

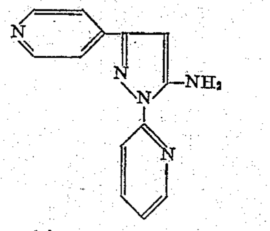

in white crystals melting at 138 to 140° C.

*Example 4*

A solution of 10 grams of isonicotinoyl acetonitrile, 10 grams of phenylhydrazine, 3 cc. of concentrated hydrochloric acid in 100 cc. of ethanol is refluxed for 8 hours and then rendered alkaline by adding 2 N-sodium hydroxide solution. On addition of water a precipitate forms which is recrystallized from aqueous methanol, to yield 2-phenyl-3-amino-5-pyridyl-(4)-pyrazone of the formula

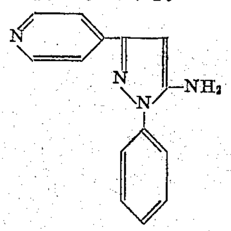

in crystals melting at 154 to 155° C.

*Example 5*

A solution of 9 grams of isonicotinoyl acetonitrile, 6 grams of meta-chlorophenylhydrazine and 2 cc. of 10 N-alcoholic hydrochloric acid in 75 c. of ethanol is refluxed for 6 hours. On addition of 20 cc. of 2 N-sodium hydroxide solution a precipitate forms which is dissolved with heating in 8 N-hydrochloric acid, filtered through Norit and precipitated again by adding 2 N-sodium hydroxide solution. The resulting product is 2-meta-chlorophenyl-3-amino-5-pyridyl-(4)-pyrazole of the formula

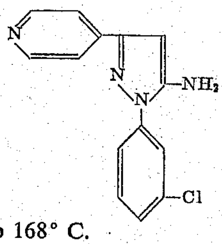

melting at 167 to 168° C.

*Example 6*

A mixture of 14.6 grms of isonicotinoyl-acetonitrille, 9.6 grams of secondary butyl hydrazine and 150 cc. of absolute alcohol is refluxed for 10 hours. The alcoholic reaction solution is purified with carbon, evaporated to dryness and the radical is recrystallized from aqueous methanol, to yield 2-secondary butyl-3-amino-5-pyridyl-(4)-pyrazole of the formula

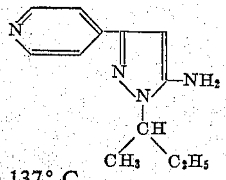

melting at 136 to 137° C.

*Example 7*

14.6 grams of isonicotinoyl acetonitrile are refluxed for 10 hours with 12 grams of pentyl-(2)-hydrazine in 150 cc. of absolute alcohol. The reaction solution is evaporated to dryness and the residue crystallized from isopropyl ether, to yield 2-pentyl-(2)-3-amino-5-pyridyl-(4)-pyrazole of the formula

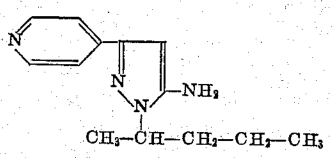

in white crystals melting at 125 to 127° C.

Isonicotinoyl acetonitrile, used as starting material, can be prepared as follows:

500 cc. of absolute alcohol are slowly dropped into 46 grams of sodium in 1.5 liters of boiling toluene. When all sodium has dissolved, the mixture is distilled until its boiling point rises to 91° C. The reaction solution is then allowed to cool to 90 C., treated with 200 grams of isonicotinic acid ethyl ester and 120 grams of acetonitrile and refluxed for 7 hours, then allowed to cool, mixed with water and the toluene layer is separated. When 280 cc. of 6.34 N-hydrochloric acid are added to the aqueous phase, isonicotinoyl acetonitrile of the formula

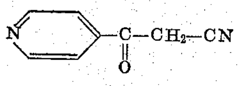

settles out. After recrystallization from water the product melts at 95–96° C.

*Example 8*

14.6 grams of isonicotinoyl acetonitrile and 7.7 grams of β-hydroxyethyl-hydrazine in 150 cc. of absolute alcohol are refluxed for 10 hours, cooled, and the separated crystals are suctioned off and recrystallized from water, to yield 2-(β-hydroxyethyl)-3-amino-5-pyridyl-(4)-pyrazole of the formula

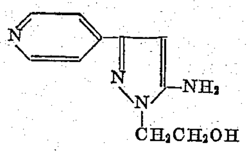

melting at 183–184° C.

*Example 9*

14.6 grams of isonicotinoyl acetonitrile and 7.7 grams of of benzylhydrazine in 150 cc. of asbolute alcohol are refluxed for 10 hours. While still hot, the solution is treated with carbon and filtered, then allowed to cool, and the separated crystals are suctioned off, to yield 2-benzyl-3-amino-5-pyridyl-(4)-pyrazole of the formula

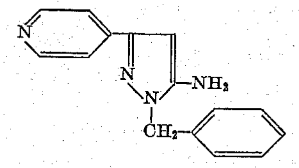

melting at 182–183° C.

*Example 10*

14.6 grams of isonicotinoyl acetonitrile and 5 grams of hydrazine hydrate in 150 cc. of absolute alcohol are refluxed for 10 hours. The reaction solution is clarified with carbon, evaporated to dryness, and the residue is recrystallized from alcohol, to yield 3-amino-5-pyridyl-(4)-pyrazole of the formula

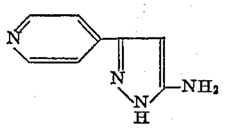

melting at 192 to 193° C.

*Example 11*

A mixture of 1.08 grams of 2-secondary butyl-3-amino-5-pyridyl-(4)-pyrazole and 0.75 cc. of acetic anhydride is kept overnight, then rendered alkaline to phenolphthalein with 2 N-sodium hydroxide solution and the crystals are suctioned off. The resulting product is 2-secondary butyl-3-acetylamino-5-pyridyl-(4)-pyrazole of the formula

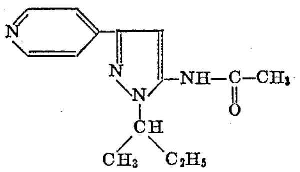

which melts at 155 to 158° C. After recrystallization from acetone+petroleum ether its melting point rises to 158.5 to 159.5° C.

4.2 grams of 2-secondary butyl-3-acetylamino-5-pyridyl-(4)-pyrazone and 3.42 grams of citric acid are dissolved in 50 cc. of water. The solution is concentrated under vacuum at room temperature until crystallization begins to set in and the crystals are suctioned off, to yield the citrate of 2-secondary butyl-3-acetylamino-5-pyridyl-(4)-pyrazole which turns transparent at 69° C. and melts at 130 to 135° C.

*Example 12*

A mixture of 10.8 grams of 2-secondary butyl-3-amino-5-pyridyl-(4)-pyrazole and 50 cc. of acetic anhydride is heated for 4 hours at 100° C., then evaporated under vacuum, and the residue is dissolved in ether and agitated with 2 N-sodium hydroxide solution. The ether solution is dried and evaporated, and the residue is recrystallized from ether, to yield N-diacetyl-2-secondary butyl-3-amino-5-pyridyl-(4)-pyrazone melting at 121 to 122° C.

*Example 13*

14.6 grams of isonicotinoyl acetonitrile and 13.1 grams of β-(diethylaminoethyl)-hydrazine in 150 cc. of absolute alcohol are refluxed for 10 hours. The alcoholic reaction solution is then evaporated to dryness, and the residue is treated with water and extracted with chloroform. Evaporation of the chloroform solution yields 2 - (β - diethylaminoethyl) - 3 - amino - 5 - pyridyl - (4) - pyrazole of the formula

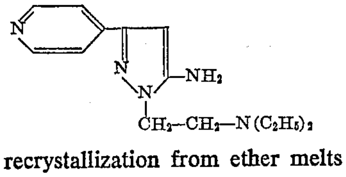

which after recrystallization from ether melts at 122 to 123° C.

A solution of 259 mg. of the above base in 5 cc. of absolute alcohol is treated with 1.25 cc. of 0.8 N-alcoholic hydrochloric acid. The reaction solution is evaporated and the residue recrystallized from alcohol+ether, to yield the monohydrochloride of 2-(β-diethylaminoethyl)-3-amino-5-pyridyl-(4)-pyrazole melting at 153 to 154° C.

*Example 14*

A solution of 20.2 grams of N-methylpiperidyl-(4)-hydrazine dichlorochloride in 510 cc. of alcohol of 98% strength is mixed with a solution of 2.3 grams of sodium in 40 cc. of absolute alcohol. The precipitated sodium chloride is filtered off, the filtrate is added to a solution of 14.6 grams of isonicotinoyl acetonitrile in 100 cc. of absolute alcohol and the whole is refluxed for 10 hours. The alcoholic reaction solution is then evaporated to dryness and the residue is dissolved in water and extracted with ether. The aqueous solution is rendered alkaline with sodium hydroxide solution and extracted with chloroform. The chloroform solution is evaporated and the residue recrystallized from alcohol, to yield 2-[-methylpiperidyl - (4)] - 3 - amino - 5 - pyridyl - (4) - pyrazole of the formula

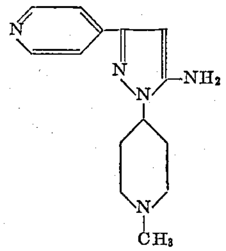

melting at 199 to 201° C.

A solution of 0.257 mg. of the above base in 5 cc. of absolute alcohol is mixed with 1.25 cc. of 0.8 N-alcoholic hydrochloric acid. The alcoholic reaction solution is evaporated and the residue recrystallized from alcohol+ether, to yield the hydrochloride of 2-[N-methyl-piperidyl-(4)]-3-amino-5-pyridyl-(4)-pyrazole melting at 251 to 252° C.

*Example 15*

A solution of 10.8 grams of 2-secondary butyl-3-amino-5-pyridyl-(4)-pyrazole in 40 cc. of absolute alcohol is mixed with 47.6 cc. of 1.05 N-alcoholic hydrochloric acid. The reaction solution is evaporated to dryness and the residue recrystallized from alcohol+ether, to yield the hydrochloride of 2-secondary butyl-3-amino-5-pyridyl-(4)-pyrazole melting at 166 to 167° C.

*Example 16*

21 grams of 2-methyl-quinolinoyl-(4)-acetonitrile are boiled under reflux for 10 hours with 10 grams of secondary butylhydrazine of 96% strength in 200 cc. of absolute alcohol. The alcoholic reaction solution is then evaporated to dryness, the residue dissolved in N-hydrochloric acid and extracted with methylene chloride. The aqueous acidic solution is adjusted to pH 9 with 7 N-sodium hydroxide solution and extracted with methylene chloride. The methylene chloride solution is dried, purified with carbon and highly concentrated. On the addition of ether, 2-secondary butyl-3-amino-5-[2-methyl-quinolyl-(4)]-pyrazole of the formula

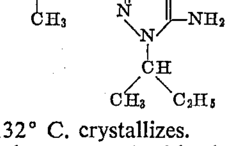

melting at 130–132° C. crystallizes.

The hydrochloride prepared with alcoholic hydrochloric acid becomes transparent at 155° C. and melts at 182° C.

The 2-methyl-quinolinoyl-(4)-acetonitrile used as starting material is prepared as follows:

88 cc. of absolute alcohol are added dropwise to 8.1 grams of sodium in 265 cc. of boiling absolute toluene.

After the sodium has dissolved, about 110 cc. of a mixture of alcohol and toluene are distilled off. The reaction solution is then allowed to cool to 90° C., 50 grams of 2-methyl-cinchonic acid ethyl ester and 21 grams of acetonitrile are added and the whole boiled under reflux for 7 hours. After cooling, water is added and the toluene layer separated. After the addition of 57.7 cc. of 6.06 N-hydrochloric acid, 2-methyl-quinolinoyl-(4)-acetonitrile of the formula

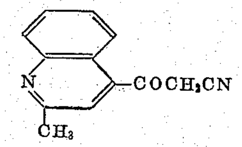

precipitates which, after recrystallization from a mixture of alcohol and water, melts at 154–155° C.

*Example 17*

21.6 grams of 2-secondary butyl-3-amino-5-pyridyl-(4)-pyrazole and 7.9 grams of ethyl-isocyanate are heated in 200 cc. of absolute dioxane in a sealed tube for 6 hours at 60° C. The hot reaction solution is treated with carbon and filtered. The crystals which precipitate after cooling are filtered with suction and washed with ether to yield N-[2-secondary butyl-5-pyridyl-(4)-pyrazolyl-(3)]-N'-ethyl-urea of the formula

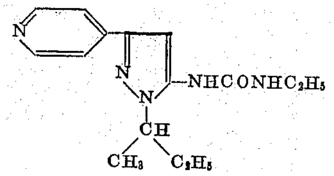

melting at 142–143° C.

*Example 18*

16.2 grams of 2-secondary butyl-3-amino-5-pyridyl-(4)-pyrazole and 4.28 grams of methyl-isocyanate are heated in a sealed tube for 6 hours at 60° C. The reaction solution is evaporated to dryness after being purified with carbon. The alcoholic residue is recrystallized from acetone to yield N-[2-secondary butyl-5-pyridyl-(4)-pyrazolyl-(3)]-N'-methyl-urea of the formula

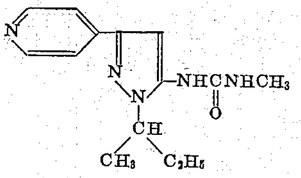

melting at 171–172° C.

*Example 19*

4.32 grams of 2-secondary butyl-3-amino-5-pyridyl-(4)-pyrazole are allowed to stand in 85 cc. of ethyl acetate and 1.31 cc. of methyl iodide for 12 hours at room temperature, and the crystals are then filtered with suction to yield 2-secondary butyl-3-amino-5-pyridyl-(4)-pyrazole-methoiodide of the formula

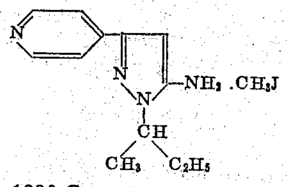

melting at 186–188° C.

*Example 20*

A solution of 14.6 grams of cyclohexyl-hydrazine hydrochloride in 100 cc. of ethanol is treated with a solution of 2.3 grams of sodium in 40 cc. of absolute ethanol. The precipitated sodium chloride is filtered off, 14.6 grams of isonicotinoyl-acetonitrile are added to the filtrate and the reaction mixture boiled under reflux for 10 hours. The reaction solution is then evaporated to dryness, the residue dissolved in ethanol, carbon is added and the whole filtered. From the concentrated filtrate 2-cyclohexyl-3-amino-5-pyridyl-(4)-pyrazole of the formula

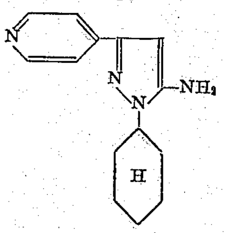

melting at 185–187° C. crystallizes out. After recrystallization from ethanol the melting point rises to 188–189° C.

*Example 21*

12 grams of chloroformic acid ethyl ester are added in the course of 20 minutes at 0–5° C. with stirring to 12.3 grams of isonicotinic acid in 250 cc. of methylene chloride and 10.1 grams of triethylamine; stirring is then continued for 30 minutes at 0–5° C. 21.6 grams of 2-secondary butyl-3-amino-5-pyridyl-(4)-pyrazole are added to the reaction solution at 0–5° C., and stirring is continued for 2 hours at 20° C. The precipitated product is filtered off and the methylene chloride solution washed with water and dried. The residue obtained by exaporating the solution is recrystallized from acetone to yield 2-secondary butyl-3-isonicotinoylamino-5-pyridyl-(4)-pyrazole of the formula

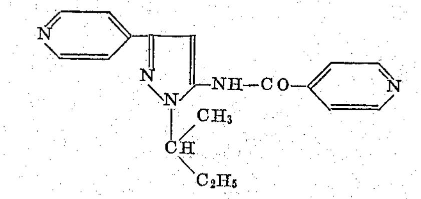

melting at 194–195° C.

*Example 22*

8.16 cc. of propionic anhydride are added to 8.64 grams of 2-secondary butyl-3-amino-5-pyridyl-(4)-pyrazole, and the whole is left to stand overnight. Chloroform is added to the reaction mixture which is then rapidly extracted with N-sodium hydroxide solution. The chloroform solution is dried and evaporated. The resulting residue is distilled under a high vacuum and the main fraction (B.P. 194–198° C. under 0.09 mm. of pressure) is recrystallized from a mixture of acetone and petroleum ether. 2-secondary butyl-3-propionylamino-5-pyridyl-(4)-pyrazole of the formula

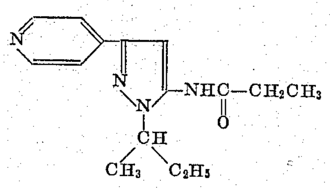

melting at 122–123° C. is obtained.

*Example 23*

10.3 cc. of n-butyric anhydride are added to 8.64 grams of 2-secondary butyl-3-amino-5-pyridyl-(4)-pyrazole and the whole is left to stand overnight. Chloroform is added to the reaction mixture which is then rapidly extracted with N-sodium hydroxide solution. The chloroform solution is dried and evaporated. The resulting residue is distilled under a high vacum and the main fraction (boiling at 200–208° C. under 0.08 mm. of pressure) is recrystallized from a mixture of acetone and petroleum ether to yield 2-secondary butyl-3-(n-butyrylamino)-5-pyridyl-(4)-pyrazole of the formula

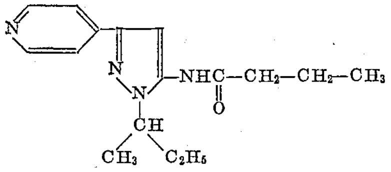

melting at 85–87° C.

*Example 24*

10.12 grams of isobutyric acid anhydride are added to 8.64 grams of 2-secondary butyl-3-amino-5-pyridyl-(4)-pyrazole and the whole is allowed to stand overnight. The reaction mixture is then taken up in chloroform and rapidly extracted with N-sodium hydroxide solution. The chloroform solution is dried and evaporated. The resulting residue is recrystallized from a mixture of acetone and ether to yield 2-secondary butyl-3-isobutyrylamino-5-pyridyl-(4)-pyrazole of the formula

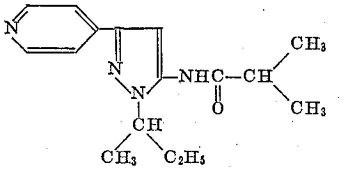

melting at 128–130° C.

*Example 25*

10.8 grams of 2-secondary butyl-3-amino-5-pyridyl-(4)-pyrazole are heated with 20 cc. of pyridine and 7 grams of benzoyl chloride for 30 minutes on a water-bath. After cooling, the reaction mixture is stirred into water. The precipitated crystals are suction-filtered and treated with acetone. Any undissolved material is filtered off and the filtrate concentrated, 2-secondary butyl-3-benzoylamino-5-pyridyl-(4)-pyrazole of the formula

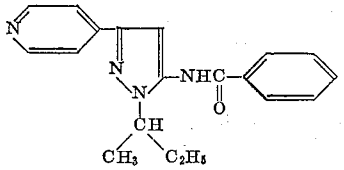

melting at 179–182° C. precipitating; after recrystallization from acetone the product melts at 182–185° C.

*Example 26*

110 cc. of a solution of bromine in glacial acetic acid containing 75 mg. of bromine per cc. is added dropwise to 10.8 grams of 2-secondary butyl-3-amino-5-pyridyl-(4)-pyrazole dissolved in 120 cc. of glacial acetic acid at a temperature of about 30° C. with stirring. The reaction solution, in which the reaction product has already partially precipitated, is then evaporated to dryness in vacuo. The crystalline residue is dissolved in water and rendered alkaline with 2 N-sodium hydroxide solution, whereupon 2-secondary butyl-3-amino-4-bromo-5-pyridyl-(4)-pyrazole of the formula

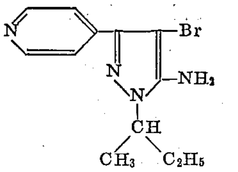

melting at 117–118° C. precipitates. After recrystallization from ether the melting point rises to 120–121° C.

*Example 27*

16 grams of α-(isonicotinoyl)-propionitrile are boiled for 10 hours under reflux with 10.3 grams of secondary butylhydrazine of 94% strength in 200 cc. of absolute ethanol. The ethanolic reaction solution is then evaporated to dryness. The residue is recrystallized from a mixture of ether and petroleum ether to yield 2-secondary butyl-3-amino-4-methyl-5-pyridyl-(4)-pyrazole of the formula

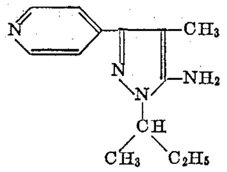

melting at 86–87° C.

230 mg. of the above base are treated with 210 mg. of citric acid hydrate in 2.3 cc. of water at a temperature of 27° C. After being allowed to stand for some time and being cooled, the citrate of 2-secondary butyl-3-amino-4-methyl-5-pyridyl-(4)-pyrazole melting at 106–113° C. crystallizes out in the form of yellow crystals.

The α-(isonicotinoyl)-propionitrile used as starting material is prepared as follows:

500 cc. of absolute ethanol are slowly added dropwise to 46 grams of sodium in 1.5 liters of boiling toluene. After the sodium has dissolved, 620 cc. of a mixture of ethanol and toluene are distilled off and 300 cc. of absolute toluene freshly added. The reaction solution is then allowed to cool to 90° C., 200 grams of isonicotinic acid ethyl ester and 162 grams of propionitrile are added and the whole is boiled under reflux for 7 hours. After cooling, water is added and the toluene layer separated. After the addition of 326 cc. of 6.12 N-hydrochloric acid, α-isonicotinoyl-propionitrile of the formula

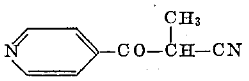

precipitates.

*Example 28*

34.8 grams of α-(isonicotinoyl)-n-butyro-nitrile and 20.6 grams of secondary butylhydrazine of 94% strength are boiled under reflux for 10 hours in 200 cc. of absolute alcohol. After cooling, the reaction mixture is evaporated to dryness and the residue recrystallized from ethanol to yield 2-secondary butyl-3-amino-4-ethyl-5-pyridyl-(4)-pyrazole of the formula

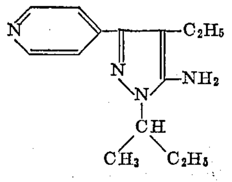

melting at 117–119° C.

12.2 grams of the above base are dissolved in 50 cc. of absolute ethanol and treated with 29 cc. of 1.72 N-ethanolic hydrochloric acid. The reaction mixture is somewhat concentrated, treated with ether, whereupon the hydrochloride of 2-secondary butyl-3-amino-4-ethyl-5-pyridyl-(4)-pyrazole melting at 166–168° C. precipitates.

*Example 29*

34.8 grams of α-(isonicotinoyl)-n-butyro-nitrile and 17 grams of β-hydroxy-ethyl-hydrazine are boiled under reflux for 10 hours in 200 cc. of absolute ethanol. The reaction mixture is then evaporated to dryness and the residue recrystallized from ethanol. 11.6 grams of the resulting crystallisate are dissolved in 50 cc. of absolute ethanol and treated with 26.8 cc. of 1.87 N-ethanolic hydrochloric acid. Cooling is carried out with ice and the precipitated crystals are suctioned off. The hydrochloride of 2-(β-hydroxyethyl)-3-amino-4-ethyl-5-pyridyl-(4)-pyrazole of the formula

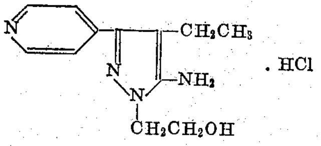

melting at 212–214° C. is obtained.

*Example 30*

34.8 grams of α-(isonicotinoyl)-n-butyro-nitrile and 29 grams of β-diethylamino-ethyl-hydrazine are boiled under reflux for 10 hours in 200 cc. of absolute ethanol. The reaction mixture is then evaporated to dryness and recrystallized from alcohol to yield 2-(β-diethylamino-ethyl)-3-amino-4-ethyl-5-pyridyl-(4)-pyrazole of the formula

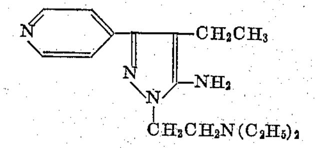

melting at 73–75° C.

The α-isonicotinoyl-n-butyronitrile used as starting material is prepared as follows:

500 cc. of absolute ethanol are slowly added dropwise to 46 grams of sodium in 1.5 liters of boiling toluene. After the sodium has dissolved, 750 cc. of a mixture of ethanol and toluene are distilled off. The reaction solution is allowed to cool to 90° C., 200 grams of isonicotinic acid ethyl ester and 202 grams of n-butyronitrile are added and the whole is boiled under reflux for 7 hours. After cooling, water is added and the toluene layer separated. After the addition of 326 cc. of 6.12 N-hydrochloric acid with cooling, a crystalline product separates which is suction-filtered and dried over phosphorus pentoxide. The dry crystallisate is suspended in methylene chloride and stirred for about 30 minutes at room temperature. Any undissolved material is filtered off and the filtrate evaporated to dryness at 30° C. in vacuo. α-(isonicotinoyl)-n-butyronitrile of the formula

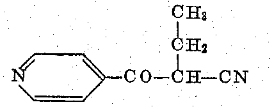

is obtained.

*Example 31*

18.8 grams of α-isonicotinoyl-isovalero-nitrile and 14.5 grams of β-diethylaminoethyl-hydrozine are boiled under reflux for 10 hours in 150 cc. of absolute ethanol. The reaction mixture is then evaporated to dryness in vacuo and the residue recrystallized from a mixture of ether and petroleum ether to yield 2-(β-diethylamino-ethyl)-3-amino-4-isopropyl-5-pyridyl-(4)-pyrazole of the formula

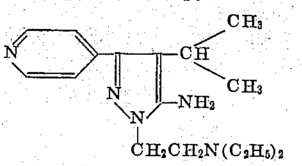

melting at 74–76° C.

*Example 32*

18.8 grams of α-isonicotinoyl-isovalero-nitrile and 10.3 grams of secondary butylhydrazine of 94% strength are boiled under reflux for 10 hours in 100 cc. of absolute ethanol and then evaporated to dryness in vacuo. The residue is recrystallized from ethanol to yield 2-secondary butyl-3-amino-4-isopropyl-5-pyridyl-(4)-pyrazole of the formula

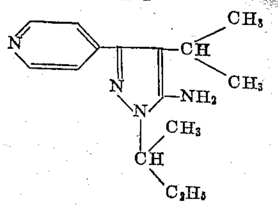

melting at 128–129° C.

*Example 33*

A solution of 4.6 grams of sodium in 80 cc. of absolute ethanol is added to a solution of 20.2 grams of N-methyl-piperidyl-(4)-hydrazine dihydrochloride in 515 cc. of ethanol of 97% strength. The precipitated sodium chloride is filtered off, the filtrate added to a solution of 18.8 grams of α-isonicotinoyl-isovaleronitrile in 100 cc. of absolute ethanol and the whole is boiled under reflux for 10 hours. The reaction solution is then evaporated to dryness and the residue recrystallized from ethanol to yield 2-[N-methyl-piperidyl-(4)]-3-amino-4-iso-propyl-5-pyridyl-(4)-pyrazole of the formula

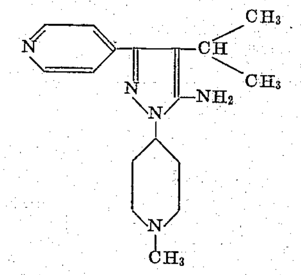

melting at 192–194° C.

The α-isonicotinoyl-isovaleronitrile used as starting material is prepared as follows:

500 cc. of absolute ethanol are slowly added to 46 grams of sodium in 1.5 liters of boiling toluene. After the sodium has dissolved, 670 cc. of a mixture of ethanol and toluene are distilled off. The reaction mixture is allowed to cool to 90° C., 200 grams of isonicotinic acid ethyl ester and 243 grams of isovaleronitrile are added and the whole is boiled under reflux for 7 hours. After cooling, water is added and the toluene layer separated. After the addition of 326 cc. of 6.12 N-hydrochloric acid (with cooling) a crystalline product separates which is filtered with suction and dried over phosphorus pentoxide. The dry crystallisate is suspended in methylene chloride and stirred for about 30 minutes at room temperature. Any undissolved material is filtered off and the filtrate evaporated to dryness at 30° C. in vacuo. There is obtained α-isonicotinoyl-isovaleronitrile of the formula

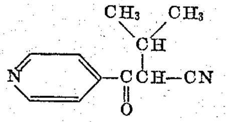

melting at 78–80° C. After recrystallization from a mixture of ethanol and water the melting point rises to 80–81° C. (dried under a high vacuum).

*Example 34*

The new compounds may be made up into pharmaceutical preparations in the conventional manner. For example, with 2-secondary butyl-3-amino-5-pyridyl-(4)-pyrazole or its hydrochloride the following preparations may be made:

Injectable solutions:

| | |
|---|---|
| 2-secondary butyl-3-amino-5-pyridyl-(4)-pyrazole hydrochloride ________mg__ | 100.0 |
| Water for injection purposes to make ___cc__ | 2.0 |

*Method.*—The active substance is dissolved in the given

...ation in water for injection purposes. The solution is filtered in the ordinary manner, filled into ampoules and sterilized by heating.

| Tablets: | Mg. |
|---|---|
| 2 - secondary butyl - 3 - amino - 5 - pyridyl-(4)-pyrazole | 100.0 |
| Colloidal silicic acid | 15.0 |
| Starch | 161.0 |
| Gelatine | 3.0 |
| Stearic acid and talc | 21.0 |
| | 300.0 |

*Method.*—The active substance is mixed homogeneously with part of the silicic acid and starch, the mixture processed with an aqueous paste of starch and gelatine to form a pliable mass and the latter granulated in the conventional manner. The remaining ingredients are added to the dry, sieved granulate and then compressed to form tablets weighing 300 mg.

What is claimed:

1. Pyridoyl-(4)-acetonitrile.
2. 2-methyl-quinolinoyl-(4)-acetonitrile.
3. α-Isonicotinoyl-n-butyronitrile.
4. α-Isonicotinoyl-isovaleronitrile.
5. A member selected from the group consisting of 2-secondary butyl-3-amino-5-[2-methyl-quinolyl-(4)] - pyrazole and its therapeutically useful acid addition salts.
6. A member selected from the group consisting of compounds of the formula

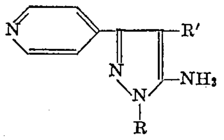

and their therapeutically acceptable acid addition salts, in which R represents a member selected from the group consisting of hydrogen, lower alkyl, hydroxy-lower alkyl, amino-lower alkyl, mono- and di-lower alkylamino-lower alkyl, pyrrolidino, piperidino, morpholino, piperazino, N-lower alkyl-piperazino, N-hydroxy-lower alkyl-piperazino, and lower cycloalkyl, phenyl, lower alkyl-phenyl, lower alkoxy-phenyl, halogeno-phenyl and pyridyl and R′ represents a member selected from the group consisting of hydrogen and lower alkyl.

7. A member selected from the group consisting of 3-(N-acyl)-derivatives of the compounds claimed in claim 6 and their therapeutically acceptacle acid addition salts, wherein the acyl substituent is that of an acid selected from the group consisting of carbamic acid, N-alkyl-carbamic acid, lower alkanoic acids, halogeno-lower alkanoic acids, hydroxy-lower alkanoic acids, amino-lower alkanoic acids, cyclo-alkane carboxylic acids, cycloalkyl-alkane carboxylic acids, benzoic acid, lower alkyl-benzoic acid, lower alkoxy-benzoic acid, halogeno-benzoic acid and pyridine-carboxylic acids.

8. A compound of the formula

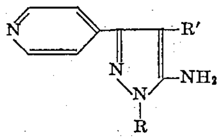

in which R represents N-alkyl-piperidyl and R′ represents lower alkyl.

9. A member selected from the group consisting of 3-(N-acyl)-derivatives of the compounds claimed in claim 8 and their therapeutically acceptable acid addition salts, wherein the acyl substituent is that of an acid selected from the group consisting of carbamic acid, N-alkyl-carbamic acid, lower alkanoic acids, halogeno-lower alkanoic acids, hydroxy-lower alkanoic acids, amino-lower alkanoic acids, cyclo-alkane carboxylic acids, cycloalkyl-alkane carboxylic acids, benzoic acid, lower alkyl-benzoic acid, lower alkoxy-benzoic acid, halogeno-benzoic acid and pyridine-carboxylic acids.

10. 2-secondary butyl-3-amino-5-pyridyl-(4)-pyrazole.
11. 2-isopropyl-3-amino-5-pyridyl-(4)-pyrazole.
12. 2-(β-hydroxy-ethyl)-3-amino-5-pyridyl - (4) - pyrazole.
13. 2-benzyl-3-amino-5-pyridyl-(4)-pyrazole.
14. 2-secondary butyl-3-acetamino-5-pyridyl-(4) - pyrazole.
15. 2-(β-diethylamino-ethyl)-3-amino-5 - pyridyl - (4)-pyrazole.
16. 2-[N-methyl-piperidyl-(4)]-3-amino-5-pyridyl-(4)-pyrazole.
17. N-[2-secondary butyl-5 - pyridyl - (4) - pyrazolyl-(3)]-N′-ethyl-urea.
18. N-[2-secondary butyl-5-pyridyl-(4)-pyrazolyl-(3)]-N′-methyl-urea.
19. 2-secondary butyl-3-amino-4-methyl-5-pyridyl-(4)-pyrazole.
20. 2-[N-methyl-pyridyl-(4)]-3-amino-4 - isopropyl - 5-idyl-(4)-pyrazole.
21. A 3-(N-lower alkanoyl)-derivative of 2-secondary butyl-3-amino-5-pyridyl-(4)-pyrazole.
22. A compound of the formula

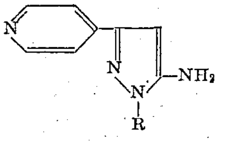

wherein R is N-alkyl-piperidyl.

23. 3-(N-acyl)-derivatives of the compounds claimed in claim 22, wherein the acyl substituent is that of an acid selected from the group consisting of carbamic acid, N-alkyl-carbamic acid, lower alkanoic acids, halogeno-lower alkanoic acids, hydroxy-lower alkanoic acids, amino-lower alkanoic acids, cyclo-alkane carboxylic acids, cycloalkyl-alkane carboxylic acids, benzoic acid, lower alkyl-benzoic acid, lower alkoxy-benzoic acid, halogeno-benzoic acid and pyridine-carboxylic acids.

24. A 3-(N-lower alkanoyl)-derivative of a compound of the formula

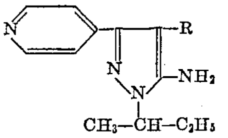

in which R is lower alkyl.

25. A 3-(N-lower alkyl-carbamoyl)-derivative of a compound of the formula

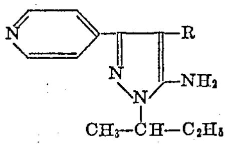

in which R is lower alkyl.

26. A therapeutically useful acid addition salt of the compound of claim 16.

References Cited in the file of this patent

UNITED STATES PATENTS

| | | |
|---|---|---|
| 2,833,779 | Fields et al. | May 6, 1958 |
| 2,903,460 | Jucker et al. | Sept. 8, 1959 |
| 3,041,343 | Jucker et al. | June 26, 1962 |

OTHER REFERENCES

Lunde: J. Chem. Soc., 1933, pp. 686–7.

Clemo et al.: J. Chem. Soc., 1934, pp. 1739–41.

Lorz et al.: J. Am. Chem. Soc., vol. 70, pp. 1904–1907 (1948).

Eby et al.: J. Am. Chem. Soc., vol. 79, pp. 723–5 (1957).

Nakashima: Chem. Abs., vol. 52, p. 6345 (1959).